(12) United States Patent
Geppert

(10) Patent No.: US 12,152,876 B2
(45) Date of Patent: Nov. 26, 2024

(54) MEASURING DEVICE FOR MEASURING THE LENGTH OF SEALING PROFILES

(71) Applicant: ATN Hölzel GmbH, Oppach (DE)

(72) Inventor: Immo Geppert, Oppach (DE)

(73) Assignee: ATN Hölzel GmbH, Oppach (DE)

( * ) Notice: Subject to any disclaimer, the term of this patent is extended or adjusted under 35 U.S.C. 154(b) by 393 days.

(21) Appl. No.: 17/787,341

(22) PCT Filed: Dec. 18, 2020

(86) PCT No.: PCT/DE2020/101081
§ 371 (c)(1),
(2) Date: Jun. 20, 2022

(87) PCT Pub. No.: WO2021/121488
PCT Pub. Date: Jun. 24, 2021

(65) Prior Publication Data
US 2023/0019401 A1     Jan. 19, 2023

(30) Foreign Application Priority Data
Dec. 20, 2019   (DE) .................. 102019135647.4

(51) Int. Cl.
*G01B 5/04*     (2006.01)
*G01B 7/02*     (2006.01)

(52) U.S. Cl.
CPC ............. *G01B 5/043* (2013.01); *G01B 7/026* (2013.01)

(58) Field of Classification Search
CPC ...................................... G01B 5/043
USPC ................................................... 33/776, 778
See application file for complete search history.

(56) References Cited

U.S. PATENT DOCUMENTS

| | | | | |
|---|---|---|---|---|
| 3,829,976 A * | 8/1974 | Moore | .................. | G01B 5/043 33/744 |
| 4,480,487 A * | 11/1984 | Kunzfeld | .................. | G01L 5/08 73/862.453 |
| 4,646,442 A * | 3/1987 | Bhattacharya | ......... | G01B 7/042 33/778 |
| 5,936,398 A * | 8/1999 | Bellefeuille | ........... | G01B 5/043 33/778 |
| 8,185,002 B2 * | 5/2012 | Takahashi | ............ | G03G 15/754 399/302 |

(Continued)

FOREIGN PATENT DOCUMENTS

| | | |
|---|---|---|
| DE | 20216704 U1 | 1/2003 |
| DE | 102014112185 A1 | 3/2016 |

(Continued)

*Primary Examiner* — George B Bennett
(74) *Attorney, Agent, or Firm* — Michael Soderman

(57) ABSTRACT

Measuring device (1) for measuring the length of sealing profiles (2) in a sealing profile application device, comprising a measuring belt (4). The measuring belt runs over at least two rollers (3a, 3b). The measuring belt (4) and/or at least one of the rollers (3a, 3b) interacts with a measured value acquisition system (5), a transport fixture (6) with a conveyor belt (7) running over rollers (3a, 3b) being arranged opposite the measuring belt (4). The measuring device (1) is arranged in an application head (8) of the sealing profile application device'. Also, a measuring belt contact area (KM) of the sealing profile (2) with the measuring belt (4) extends longer than a transport contact area (KT) of the sealing profile (2) with the conveyor belt (7).

10 Claims, 5 Drawing Sheets

(56) References Cited

U.S. PATENT DOCUMENTS

| | | | |
|---|---|---|---|
| 8,466,380 B2* | 6/2013 | Inoue | G01G 13/08 |
| | | | 702/159 |
| 8,693,009 B2* | 4/2014 | Furuya | G01B 5/043 |
| | | | 358/1.14 |
| 8,839,949 B2* | 9/2014 | Vogeley, Jr. | B65G 43/08 |
| | | | 198/810.03 |
| 10,801,902 B2* | 10/2020 | Kleczewski | G01G 7/00 |
| 11,235,934 B2* | 2/2022 | Kataria | B65G 43/04 |
| 12,000,415 B1* | 6/2024 | Sessions | F15B 15/1471 |
| 12,037,201 B2* | 7/2024 | Kleczewski | G01D 5/248 |
| 2004/0154413 A1* | 8/2004 | Coy | G01M 13/023 |
| | | | 73/862.453 |
| 2015/0253181 A1* | 9/2015 | Miyata | G01H 13/00 |
| | | | 73/579 |
| 2021/0018063 A1* | 1/2021 | Noborikawa | D03D 15/217 |
| 2023/0407948 A1* | 12/2023 | Lindner | F16H 7/08 |

FOREIGN PATENT DOCUMENTS

| | | |
|---|---|---|
| EP | 496049 A1 | 7/1992 |
| JP | H06300553 A | 10/1994 |
| WO | 2016030131 A1 | 3/2016 |

\* cited by examiner

MEASURING DEVICE FOR MEASURING THE LENGTH OF SEALING PROFILES

CROSS REFERENCE TO RELATED APPLICATIONS

This application is the U.S. national stage of International Application No. PCT/DE2020/101081, filed on 2020 Dec. 18. The international application claims the priority of DE 102019135647.4 filed on 2019 Dec. 20; all applications are incorporated by reference herein in their entirety.

BACKGROUND

The invention relates to a measuring device for measuring the length of sealing profiles in a sealing profile application device.

The background to the invention is that by means of sealing profile application devices, a sealing profile is drawn off from a spool/reel or a depot or buffer by feeding by means of a transport device and applied to a body part by means of an application roller according to the specifications. For this purpose, the sealing profile is provided with an adhesive surface, the adhesive surface being covered with a release tape—hereinafter referred to as liner—which is peeled off/removed only immediately before the sealing profile is applied to the body part.

A further background to the invention is to be seen in the fact that the device is intended to measure or detect both the stretching and the compression of the sealing profile rubber. The body part to be applied may be divided into different segments. The predetermined value of the compression or stretching may be different in each segment. The actual length per segment can be determined with the aid of the measuring device for length measurement. This makes it possible to evaluate the compression or stretching of the sealing profile segment by segment.

Various measuring devices are known which are provided for measuring the length of the sealing profile protruded by the transport fixture in a sealing profile application device.

For example, WO 2016030131 A1 discloses a device and a method intended to determine the stretching or compression of an applied, self-adhesive sealing profile on a body part of a vehicle. This publication has also been published as EP 3043953 B1. To measure the length of the sealing profile, a measuring transducer with a measuring roller rolling on the sealing profile is provided, which is arranged in front of the drive system.

Furthermore, measuring devices are known which, as disclosed in DE 20216704 U1, are intended for measuring the length of hoses, cables or pipes. Here, the measuring device is implemented by an endless link, such as a belt, circulating over deflection rollers. One embodiment provides that one circulating endless link is driven and thus serves to advance the object to be measured, and a second, oppositely arranged, circulating endless link is used for length measurement.

From the publication EP 496049 A1 a cable length measuring device with a transport fixture formed with two belt drives arranged opposite each other is known. A measuring roller is arranged outside the belt drives.

SUMMARY

The object of the invention is to provide a measuring device which makes it possible to measure the length of sealing profile rubbers to be applied to body parts of vehicles. The length measurement is to be as precise as possible. Accordingly, creeping between the sealing profile and the measuring system is to be avoided.

Measuring device (1) for measuring the length of sealing profiles (2) in a sealing profile application device, comprising a measuring belt (4) running over at least two rollers (3a, 3b), the measuring belt (4) and/or at least one of the rollers (3a, 3b) interacting with a measured value acquisition system (5), a transport fixture (6) with a conveyor belt (7) running over rollers (3a, 3b) being arranged opposite the measuring belt (4), characterized in,
that the measuring device (1) is arranged in an application head (8) of the sealing profile application device
and
in that a measuring belt contact area (KM) of the sealing profile (2) with the measuring belt (4) extends longer than a transport contact area (KT) of the sealing profile (2) with the conveyor belt (7).

DETAILED DESCRIPTION

The object of the invention is to provide a measuring device which makes it possible to measure the length of sealing profile rubbers to be applied to body parts of vehicles. The length measurement is to be as precise as possible. Accordingly, creeping between the sealing profile and the measuring system is to be avoided.

The invention relates to a measuring device for measuring the length of sealing profiles in a sealing profile application device. The measuring device comprises a measuring belt circulating over at least two rollers, the measuring belt and/or at least one of the rollers interacting with a measured value acquisition system. Opposite the measuring belt is a transport fixture with a transport belt circulating over rollers. Between the circulating measuring belt and the circulating conveyor belt, the sealing profile is moved/advanced by the conveyor belt.

The measuring belt is moved along by the movement of the sealing profile. This co-movement preferably takes place without tension or inhibition, so that slip-free measurement is thereby favored.

According to the invention, the task is solved with the characteristics of the main claim.

According to the inventive concept, it is provided that the measuring device—and thus also the oppositely arranged transport fixture—are arranged in an application head of the sealing profile application device, and that a measuring belt contact area of the seal profile with the measuring tape extends longer than a conveyor belt contact area of the sealing profile with the conveyor belt.

The profile seal is fed to the application head without stretching. The measuring device is arranged in the application head in such a way that this takes place immediately before the targeted compression of the sealing profile. This means that the actual length of the sealing profile is measured without stretching or compression.

The measuring contact area extends longer than the transport contact area. The longer measuring contact area generates a larger contact surface. This results in a longer or wide adhesion of the measuring belt to the liner. Thus, creeping is virtually eliminated, so that the measurement result is much more accurate than with known measuring devices. Another advantage is to be seen in the fact that the sealing profile is not damaged by teeth, as suggested by claim 18 of the publication WO 2016030131 A1.

Advantageous further embodiments of the invention are indicated in the subordinate claims.

According to an advantageous embodiment of the invention, it is provided that the measuring belt has a smooth, elastic and/or adhesive surface on the side facing a liner of the sealing profile. A liner is a release tape that is applied to the adhesive surface of the sealing profile to protect it and prevent unwanted adhesion. The liner is peeled off immediately before the profile rubber is applied and bonded to the body part.

Due to the smooth, elastic and/or adhesive surface of the measuring belt, good adhesion of the measuring belt with the liner located on the sealing profile is realized in the contact area of the measuring belt with the sealing profile. Accordingly, creeping between the liner and the measuring belt can be minimized/nearly avoided and thus the length of the sealing profile can be determined with the highest precision. The adhesive effect is achieved by a suitable/advantageous combination of the materials used for the liner and the surface of the measuring belt.

According to an advantageous embodiment of the invention, it is provided that the side of the measuring belt facing the liner of the sealing profile is made, for example, of rubber and/or polyurethane.

The exemplarily mentioned materials are smooth, elastic and/or have an adhesive surface. They are thus particularly advantageously suited to ensuring good adhesion between the measuring belt and the liner and thus enabling slip-preventing and thus precise length measurement.

According to an advantageous embodiment of the invention, it is further provided that at least one pinch roller and/or other guiding and pressure-exerting elements are arranged opposite a protruding area of the measuring belt on the side of the conveyor belt.

By means of the pinch roller and, if applicable, the other guiding and pressure-exerting elements, the sealing profile is pressed against the measuring belt, so that advantageously an adherent connection between measuring belt and liner can be achieved in the entire measuring contact area. The effective measuring contact area is thus enlarged by the protrusion area compared to the transport contact area.

In accordance with a further advantageous embodiment of the invention, it is provided that the pinch roller has a circumferential profile on the casing side.

In a preferred embodiment, the casing side profile of the pinch roller is concave. This allows advantageous lateral guidance of the transported sealing profile. The lateral guidance of the sealing profile ensures precise alignment of the sealing profile on the measuring belt and thus good adhesion in the measuring contact area. The other guiding and pressure-exerting elements can also be profiled accordingly and thus bring about the effects described above.

In an alternative design of the profiled pinch roller, it is provided that the circumferential profile of the pinch roller on the casing side corresponds to the profile of the sealing profile running over the pinch roller. This ensures uniform pressure without deforming the sealing profile. Thus, the sealing profile is pressed evenly against the measuring belt, which advantageously causes good adhesion to the measuring belt.

According to an advantageous embodiment of the invention, it is provided that the measuring device is/are arranged movable relative to the transport fixture and/or the transport fixture is/are arranged movable relative to the measuring device by means of at least one displacement device transversely to the transport direction of the sealing profile.

By means of the displacement device, the contact pressure of the measuring belt and the conveyor belt as well as the pinch roller on the sealing profile can be varied. With higher contact pressure, adhesion is improved. It is also possible to adapt the device to sealing profiles of different thicknesses. Together with the transport fixture or also separately, the pinch roller and/or other guiding and pressure-exerting elements can be arranged displaceably ensure uniform guidance of the profile sealing rubber and uniform pressure against the measuring belt.

According to a further advantageous embodiment of the invention, it is provided that the displacement of the measuring device and the transport fixture, possibly including the pinch roller and/or other guiding and pressure-exerting elements, with respect to each other is effected to the same extent. Thus, the centerline of the sealing profile remains unchanged, so that the positioning of further guiding elements of the application head does not have to be adjusted.

According to a preferred embodiment of the invention, it is provided that the measured value acquisition system is designed as a shaft encoder, in particular, as a shaft incremental encoder. Preferably, the shaft incremental encoder is integrated in a deflection roller and detects the angle of rotation of the deflection roller very precisely, such as with at least 200 pulses per revolution, such as 2000 pulses per revolution. The rotation angle is proportional to the distance traveled by the measuring belt. The rotation angle of the deflection roller is detected by a sensor and transmitted to the evaluation unit. The shaft encoder, in particular, a shaft incremental encoder, thus determines the length of the outgoing measuring belt, which corresponds to the length of the advanced sealing profile when creeping is avoided according to the invention.

A shaft incremental encoder integrated into the deflection roller offers a very cost-effective solution for acquiring the length measurement data.

BRIEF DESCRIPTION OF THE DRAWINGS

Several examples of the invention are shown in the drawings and are described in more detail below. They show FIG. 1 a perspective side view of an application head of a sealing profile application device with a measuring device, a transport fixture, a pinch roller and as a sealing profile, FIG. 2 a perspective side view of an application head of a sealing profile application device with a measuring device, a transport fixture and a sealing profile, FIG. 3 a perspective side view of an application head of a sealing profile application device with a measuring device, a transport fixture and a pinch roller, FIG. 4 a perspective side view of an application head of a sealing profile application device with a measuring device and a transport fixture and FIG. 5 a sectional view through the measuring belt and the sealing profile with a deflection roller and a pinch roller.

DETAILED DESCRIPTION OF THE PREFERRED EMBODIMENTS

Figure 1:
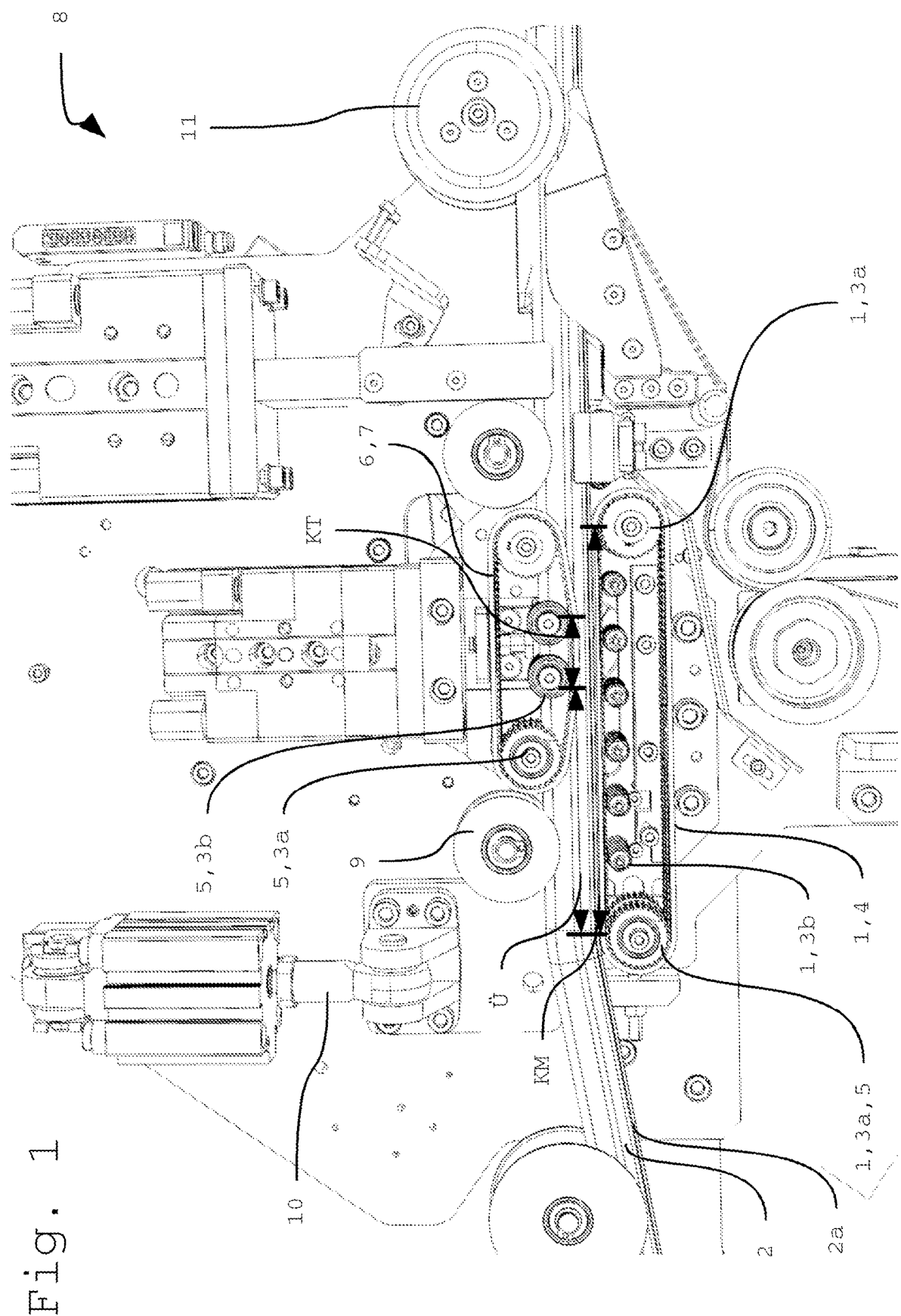

FIG. 1 shows a perspective side view of an application head 5 of a sealing profile application device (not shown) with a measuring device 1 and a transport fixture 6 for the sealing profile 2 to be applied. The sealing profile 2 is made of rubber and is designed as a hollow profile. The side of the sealing profile 2 to be bonded to the body part (not shown) is provided with an adhesive surface, the adhesive surface being covered with a plastic tape 2a, a so-called liner 2a, which serves as a release tape, which is to be taken off before immediate bonding. The sealing profile 2 is pulled off a spool/reel (not shown) by means of the transport fixture 6 and advanced to an application roller 11, by means of which the sealing profile 2 is glued/applied to the body part (not shown) 1. The transport fixture 6 here comprises two deflection rollers 3a and two support rollers 3b, over which an endless conveyor belt 7 runs. Similar to the measuring belt 4, the conveyor belt 7 is designed as a coated toothed belt. The coating is specially adapted to the surface properties of the sealing profile 2. The conveyor belt 7 presses against the sealing profile 2 in a transport contact area KT in a side of the sealing profile 2 opposite to the liner 2a, so that static friction is caused between the conveyor belt 7 and the sealing profile 2 in the transport contact area KT, which results in the sealing profile 2 being carried along with the conveyor belt 7 and thus being advanced to the application roller 11. Here, the sealing profile 2 is advanced from left to right.

The measuring belt 4 of the measuring device 1, which is arranged opposite the measuring belt 7, serves as a pressure pad for the measuring belt 7. The conveyor belt 7 in turn serves as a pressure pad for the measuring belt 4, thus ensuring that both the measuring belt 4 and the conveyor belt 7 are pressed against the sealing profile. Like the conveyor belt 7, the self-contained measuring belt 4 runs over related deflection rollers 3a. Furthermore, support rollers 3b are arranged on the measuring belt 4, which are arranged along the measuring belt contact area KM to press the measuring belt 4 against the sealing profile 2 in the entire measuring belt contact area KM and thus enable the measuring belt 4 to adhere to the sealing profile 2 with as little creeping as possible.

The endless measuring belt 4 is likewise designed as a coated toothed belt, the coating being arranged on the side facing the liner 2a. The surface of the measuring belt 4 is accordingly elastic and smooth. Due to the material combination of the surface of the measuring belt 4 with that of the liner 2a, an adhesive and thus adhering effect is achieved. Thus, the sealing profile 2 can move the measuring belt 4 along while avoiding creeping.

The measuring device 1 is designed in such a way that a minimized resistance is realized due to the smooth-running rollers 3a, 3b of the measuring device 1. This low resistance can be easily overcome by adhesion.

The measurement data acquisition is realized by a shaft incremental encoder 5, which is integrated in one of the deflection rollers 3a of the measuring device 1. The shaft incremental encoder 5 is capable of detecting the rotation angle of the respective deflection roller 3a, which is proportional to the circulation path of the measuring belt 4 and thus to the length of the advanced sealing profile 2. An evaluation unit (not shown) determines the length of the advanced sealing profile 2 from the rotation angle. With a setting of a cut in the sealing profile 2, one length measurement ends and a new length measurement begins.

According to the invention, the measuring belt contact area KM is designed to be significantly longer than the transport contact area KT.

The longer measuring belt contact area advantageously results in a larger contact area and thus greater adhesion of the measuring belt to the liner. Thus, creeping is virtually eliminated, so that the measurement result is much more accurate than with known measuring devices. Advantageously, the sealing profile cannot be damaged by teeth, as suggested by claim 18 of publication WO 2016030131 A1.

In a protruding area U, in which the measuring belt contact area KM extends beyond the transport contact area KT, a pinch roller 9 opposite the measuring belt 4 is arranged. The opposing pinch roller 9 also ensures counter pressure of the sealing profile 2 on the measuring belt 4 in the protruding area U, which advantageously improves adhesion to the liner. Alternatively or in addition to the pinch roller, other pressure-exerting and guiding elements can also be arranged to have an equivalent effect.

Here, the application head 8 is designed in such a way that the measuring device 1 can be displaced relative to the transport fixture 6 by means of a displacement device 10 designed as a hydraulic cylinder 10. This allows the distance between the measuring contact area KM and the transport contact area KT to be varied and adapted to the thickness of the sealing profile 2 and the desired contact pressure of the measuring belt 4 and the conveyor belt 7 against the sealing profile 2. Preferably, the measuring belt 4 is formed with a smooth, elastic and thus adhesive surface on the outer side on which it comes into contact with the liner 2a of the sealing profile 2. Rubber, for example, is used here as a particularly suitable material. In this way, good adhesion of the measuring belt 4 to the sealing profile 2 and thus creeping can be prevented in the measuring contact area KM. Accordingly, the length measurement of the advanced sealing profile 2 can be carried out with the highest precision.

Figure 2:
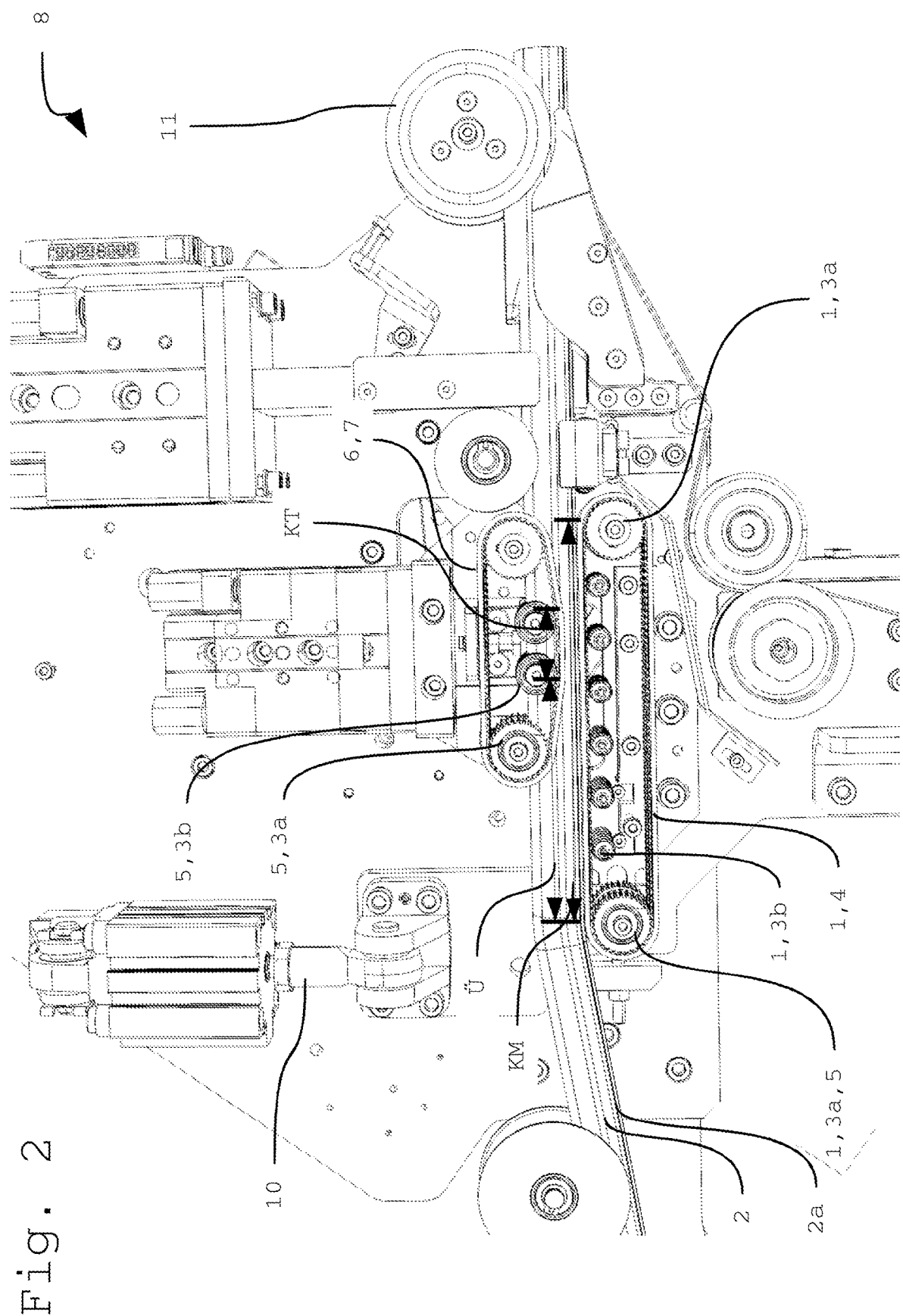

FIG. 2 shows a perspective side view of an application head 8 of a sealing profile application device with a measuring device 1 and a transport fixture 6 as well as a sealing profile 2 to be transported and measured. The representation is known from FIG. 1. The difference is that no pinch roller is provided here. The pressure of the sealing profile 2 on the measuring belt 4 in the protruding area is effected here by the sealing profile 2 being fed obliquely from below and thus already being pressed against the measuring belt 4 in the area of the first deflection roller 3a. Thus the representation corresponds to the design according to claim 1.

Figure 3:
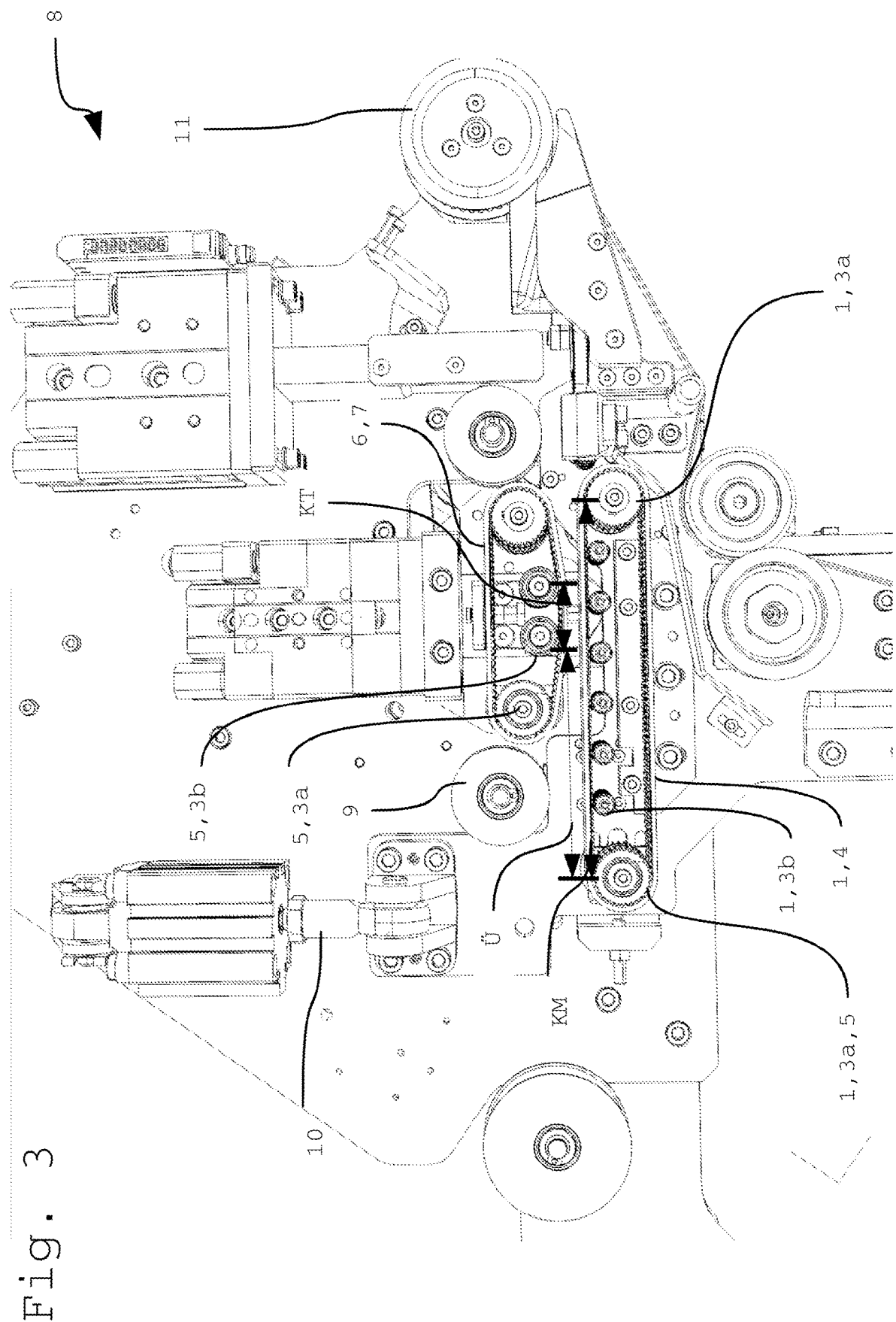

In FIG. 3, a perspective side view of an application head 8 of a sealing profile application device with a measuring device 1, a transport fixture 6 and a pinch roller 9 is shown.

Accordingly, FIG. 3 shows the design known from FIG. 1, without the sealing profile being shown here.

Figure 4:
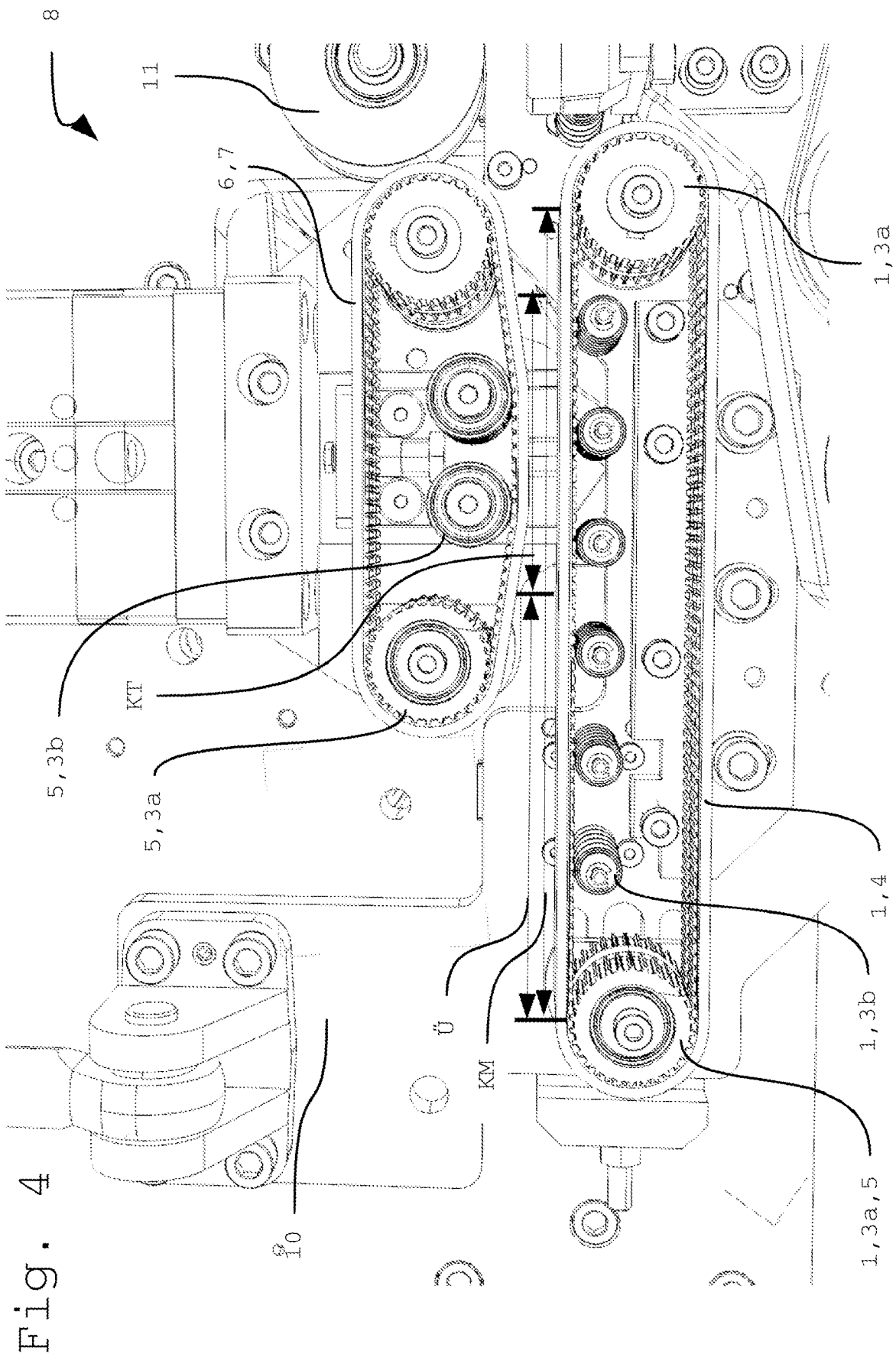

FIG. 4 shows a perspective side view of an application head 8 of a sealing profile application device with a measuring device 1 and a transport fixture 6.

Thus, the design known from FIG. 2 is shown here, whereby the sealing profile is not shown here.

Figure 5:
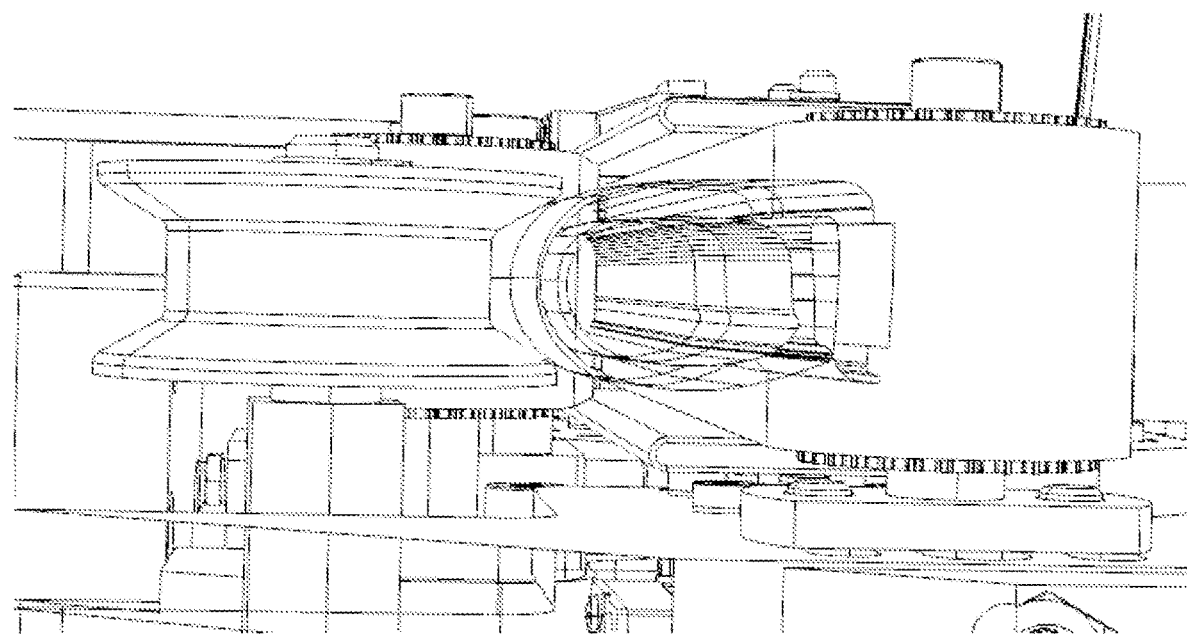
Figure 5:
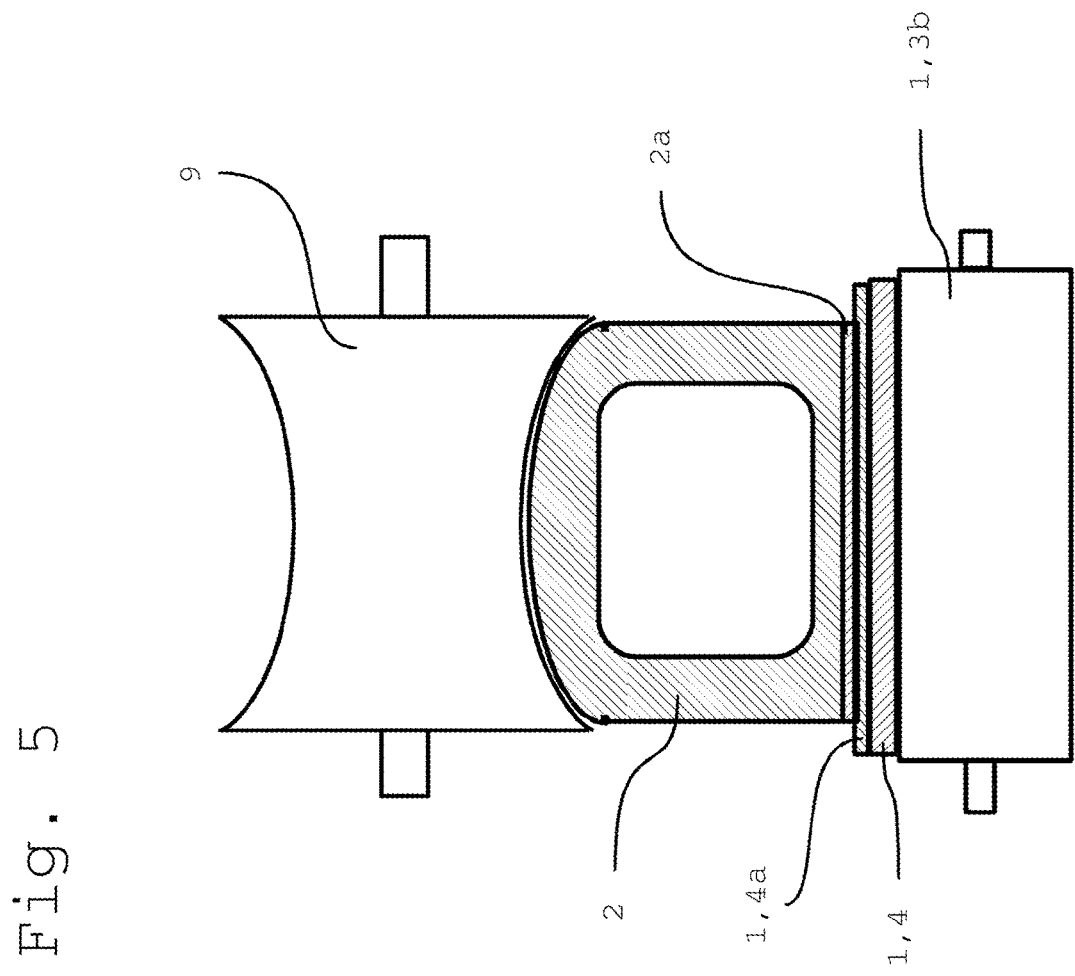

FIG. 5 shows a sectional view through the measuring belt 4 and the sealing profile 2 with the deflection roller 3a of the measuring device 1 and the pinch roller 9.

The frictional contact between the measuring belt 4 and the sealing profile 2 is achieved on the one hand by the fact that the measuring belt 4 and the sealing profile 2 are pressed together by the compressive arrangement of the deflection roller 3a and the pinch roller 9. In this process, a liner 2a is arranged on the side of the sealing profile 2 facing the measuring belt 4 to protect the adhesive surface located underneath.

On the other hand, the adhesive friction between the measuring belt 4 and the sealing profile 2 is reinforced by providing the surface of the measuring belt 4 with an adhesive coating 4a. The adhesive coating 4a is designed to bring about an adhesive effect on the surface of the liner 2a, which improves the adhesive friction between the measuring belt 4 and the sealing profile 2. The pinch roller 9 is profiled on the casing side in the same way as the side of the sealing profile 2 resting against it. This ensures that the sealing profile 2 is pressed evenly against the measuring belt 4. Advantageously, there is no deformation of the sealing profile 2. Due to the profiling, a lateral guidance of the sealing profile 2 in the application head takes place advantageously at the same time.

LIST OF REFERENCE NUMERALS

1—Measuring device
2—Sealing profile
2a—Liner
3a—Roller, deflection roller
3b—Roller, support roller
4—Measuring belt
4a—side of the measuring belt facing the liner, surface/coating of the measuring belt
5—Measured value acquisition system, shaft encoder, shaft incremental encoder
6—Transport fixture
7—Conveyor belt
8—Application head
9—Pinch roller
10—Displacement device
11—Application roller
KM—Measuring contact area
KT—Transport contact area
U—Protruding area

The invention claimed is:

1. Measuring device (1) for measuring the length of sealing profiles (2) in a sealing profile application device, comprising a measuring belt (4) running over at least two rollers (3a, 3b), the measuring belt (4) and/or at least one of the rollers (3a, 3b) interacting with a measured value acquisition system (5), a transport fixture (6) with a conveyor belt (7) running over rollers (3a, 3b) being arranged opposite the measuring belt (4), characterized in, that the measuring device (1) is arranged in an application head (8) of the sealing profile application device and in that a measuring belt contact area (KM) of the sealing profile (2) with the measuring belt (4) extends longer than a transport contact area (KT) of the sealing profile (2) with the conveyor belt (7).

2. Measuring device according to claim 1,
characterized in,
that the measuring belt (4) has a smooth, elastic and/or adhesive surface (4a) on the side facing a liner (2a) of the sealing profile (2).

3. Measuring device according to claim 2,
characterized in,
that the side of the measuring belt (4a) facing the liner (2a) of the sealing profile (2) is made of rubber and/or polyurethane.

4. Measuring device according to claim 1,
characterized in,
in that at least one pinch roller or other guiding and pressure-exerting elements (9) are arranged opposite a protruding area (U) of the measuring belt (4) on the side of the conveyor belt (7).

5. Measuring device according to claim 4,
characterized in,
that the pinch roller (9) and/or the other guiding and pressure-exerting element have a circumferential profile on the casing side.

6. Measuring device according to claim 5,
characterized in,
that the profile (P) of the pinch roller (9) and/or the other guiding and pressure-exerting elements (9) is concave.

7. Measuring device according to claim 5,
characterized in,
that the profile (P) of the pinch roller (9) and/or the other guiding and pressure-exerting elements (9) corresponds with the adjacent profile of the sealing profile (2).

8. Measuring device according to claim 1,
characterized in,
that the measuring device (1) is displaceably arranged relative to the transport fixture (6), possibly including the pinch roller (9) and/or the other guiding and pressure-exerting elements (9) and/or the transport fixture (6), possibly including the pinch roller (9) and/or the other guiding and pressure-exerting elements (9), is/are displaceably arranged relative to the measuring device (1) by means of at least one displacement device (10).

9. Measuring device according to claim 8,
characterized in,
that the displacement of the measuring device (1) and the transport fixture (6) takes place to the same extent.

10. Measuring device according to claim 1,
characterized in,
in that the measured value acquisition system (5) is designed as a shaft encoder (5), in particular, as a shaft incremental encoder (5), and is arranged in a roller (3a, 3b).

* * * * *